United States Patent
Dang et al.

(10) Patent No.: US 12,185,188 B2
(45) Date of Patent: Dec. 31, 2024

(54) LOCATION MANAGEMENT WITH DYNAMIC TAL FOR HIGH MOBILITY

(71) Applicant: Fraunhofer-Gesellschaft zur Foerderung der angewandten Forschung e.V., Munich (DE)

(72) Inventors: Thi Uyen Ly Dang, Erlangen (DE);
Thomas Heyn, Erlangen (DE);
Alexander Hofmann, Erlangen (DE);
Leszek Raschkowski, Berlin (DE);
Tugce Erkilic Civelek, Berlin (DE);
Roya Ebrahim Rezagah, Berlin (DE);
Thomas Fehrenbach, Berlin (DE);
Thomas Wirth, Berlin (DE); Cornelius Hellge, Berlin (DE); Thomas Schierl, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 17/208,826

(22) Filed: Mar. 22, 2021

(65) Prior Publication Data

US 2021/0306806 A1 Sep. 30, 2021

Related U.S. Application Data

(63) Continuation of application No. PCT/EP2019/075561, filed on Sep. 23, 2019.

(30) Foreign Application Priority Data

Sep. 27, 2018 (EP) .................................... 18197386

(51) Int. Cl.
*H04W 76/11* (2018.01)
*H04W 4/021* (2018.01)
(Continued)

(52) U.S. Cl.
CPC ........... *H04W 4/029* (2018.02); *H04W 4/021* (2013.01); *H04W 68/005* (2013.01); *H04W 76/11* (2018.02)

(58) Field of Classification Search
CPC . H04W 4/021; H04W 4/029; H04W 28/0289; H04W 36/32; H04W 48/16;
(Continued)

(56) References Cited

U.S. PATENT DOCUMENTS

| 9,769,871 B2 * | 9/2017 | Giloh .................. H04W 72/542 |
| 2008/0009297 A1 * | 1/2008 | Lotvonen .............. H04W 64/00 455/456.6 |

(Continued)

FOREIGN PATENT DOCUMENTS

| EP | 2129141 A1 | 12/2009 |
| WO | 2008054668 A2 | 5/2008 |
| WO | 2009099162 A1 | 8/2009 |

OTHER PUBLICATIONS

3GPP TR 38.811, "Study on New Radio (NR) to support non terrestrial networks", 3GPP TR 38.811: Study on New Radio (NR) to support non-terrestrial networks; V15.0.0 (Jun. 2018), Jun. 2018, 118 pp.

(Continued)

*Primary Examiner* — Jean A Gelin
(74) *Attorney, Agent, or Firm* — Perkins Coie LLP; Michael A. Glenn

(57) ABSTRACT

A wireless communication system, including: a plurality of time variant transmission points for communicating with a user device, UE, wherein the UE is in a tracking region, wherein the UE is configured to receive and store a list including identifiers, IDs, of time variant transmission points for the tracking region, and wherein the list includes IDs of time variant transmission points which are available or (Continued)

visible for the UE in the one tracking region at different times or time periods.

23 Claims, 8 Drawing Sheets

(51) Int. Cl.
*H04W 4/029* (2018.01)
*H04W 68/00* (2009.01)

(58) Field of Classification Search
CPC ... H04W 68/00; H04W 68/005; H04W 68/02; H04W 72/048; H04W 76/10; H04W 76/11; H04B 7/18504
See application file for complete search history.

(56) References Cited

U.S. PATENT DOCUMENTS

| | | | | |
|---|---|---|---|---|
| 2010/0029298 | A1* | 2/2010 | Iwamura | H04W 8/06 455/456.1 |
| 2010/0195621 | A1* | 8/2010 | Kekki | H04W 48/17 370/332 |
| 2010/0272004 | A1* | 10/2010 | Maeda | H04W 48/12 370/312 |
| 2010/0317349 | A1* | 12/2010 | Serravalle | H04W 24/10 455/456.6 |
| 2010/0322128 | A1* | 12/2010 | Becker | H04W 4/08 370/312 |
| 2011/0178658 | A1* | 7/2011 | Kotaba | G06T 7/254 701/472 |
| 2011/0263274 | A1* | 10/2011 | Fox | H04W 68/04 455/456.2 |
| 2012/0201163 | A1* | 8/2012 | Jongren | H04W 72/542 370/252 |
| 2012/0245836 | A1* | 9/2012 | White | G08G 5/06 701/120 |
| 2012/0315903 | A1* | 12/2012 | Yoshimura | H04W 60/04 455/435.1 |
| 2013/0238466 | A1* | 9/2013 | Westphal | G06Q 30/0601 705/26.61 |
| 2013/0322325 | A1* | 12/2013 | Hahn | H04W 36/0009 370/315 |
| 2014/0044058 | A1 | 2/2014 | El-saidny et al. | |
| 2014/0192781 | A1* | 7/2014 | Teyeb | H04W 36/34 370/328 |
| 2014/0349570 | A1* | 11/2014 | Pan | H04W 60/00 455/11.1 |
| 2015/0009888 | A1* | 1/2015 | Pitakdumrongkija | H04B 7/15507 370/315 |
| 2015/0215742 | A1* | 7/2015 | Ikeda | H04W 68/02 455/456.1 |
| 2015/0341865 | A1* | 11/2015 | Yang | H04L 1/1861 455/522 |
| 2016/0309448 | A1* | 10/2016 | Truelove | H04W 8/22 |
| 2017/0150404 | A1* | 5/2017 | Maeda | H04W 76/10 |
| 2017/0195987 | A1* | 7/2017 | Zarifi | H04W 68/02 |
| 2017/0238278 | A1* | 8/2017 | Yadav | H04W 28/0289 370/329 |
| 2018/0167796 | A1* | 6/2018 | Raje | H04W 4/023 |
| 2018/0217228 | A1* | 8/2018 | Edge | H04W 64/00 |
| 2018/0324662 | A1* | 11/2018 | Phuyal | H04W 48/18 |
| 2018/0367953 | A1* | 12/2018 | Shimizu | H04W 4/029 |
| 2019/0053192 | A1* | 2/2019 | Rune | H04W 60/00 |
| 2019/0082481 | A1* | 3/2019 | Ravishankar | H04W 76/10 |
| 2019/0182723 | A1* | 6/2019 | Sharma | H04W 36/04 |
| 2019/0265348 | A1* | 8/2019 | Bengtsson | G01S 13/10 |
| 2020/0154240 | A1* | 5/2020 | Edge | H04W 4/029 |
| 2022/0046517 | A1* | 2/2022 | Dang | H04W 48/04 |
| 2022/0101732 | A1* | 3/2022 | Saur | G08G 1/163 |

OTHER PUBLICATIONS

3GPP TS 38.300, "NR; NR and NG-RAN Overall Description; Stage 2 (Release 15)", 3GPP TS 38.300: Technical Specification Group Radio Access Network; NR; NR and NG-RAN Overall Description Stage 2 (Release 15); V15.2.0 (Jun. 2018), Jun. 2018, 87 pp.

Mcnair, Janise, "Location registration and paging in mobile satellite systems", Proceedings ISCC 2000. Fifth IEEE Symposium on Computers and Communications, 2000, pp. 232-237, doi: 10.1109/ISCC.2000.860644, pp. 232-237.

Mediatek Inc, "RAN Notification Area Configuration in NR", 3GPP TSG-RAN WG2 Meeting AH-1801, R2-1801302, Vancouver, Canada, Jan. 22-26, 2018, Jan. 22, 2018, 3 pp.

* cited by examiner

Location Management List (LML)

| ID trans. point | validity window |
|---|---|
| ID 1 | $b_1 - b_2$ |
| ID 2 | $b_3 - b_4$ |
| ⋮ | ⋮ |
| ID 6 | - |
| ID 7 | $b_1 - b_2$ |
| ⋮ | ⋮ |
| ID N | $b_x - b_y$ |

← static content (ID 6 row)

← dynamic content (ID N row)

| source ID | time stamp |
|---|---|
| gNB-t ID1 | $t_1 - t_2$ |
|  |  |
| gNB-t ID $N_{ter}$ | $t_3 - t_4$ |
| beam ID 1 | $t_1 - t_2$ |
| ⋮ | ⋮ |
| beam ID 4 | $t_1 - t_2$ |
| beam ID 5 | $t_2 - t_3$ |
| beam ID 6 | $t_3 - t_4$ |
| ⋮ | ⋮ |
| beam ID $N_{sat}$ | $t_x - t_y$ | terrestrial: gNB-t ID1 ... gNB-t ID $N_{ter}$ non-stationary satellite: beam ID 1 ... beam ID $N_{sat}$ time stamp to define the visibility of the ID for the UE

Fig. 9

LOCATION MANAGEMENT WITH DYNAMIC TAL FOR HIGH MOBILITY

CROSS-REFERENCES TO RELATED APPLICATIONS

This application is a continuation of copending International Application No. PCT/EP2019/075561, filed Sep. 23, 2019, which is incorporated herein by reference in its entirety, and additionally claims priority from European Application No. EP 18 197 386.8, filed Sep. 27, 2018, which is incorporated herein by reference in its entirety.

The present application relates to the field of wireless communication systems or networks, more specifically to location management of a user device/equipment, UE, i.e., mobility management using a tracking area list, TAL, in a wireless communication system. Embodiments concern a location management in a wireless communication network using the TAL, which is designed by using a moving pattern with which the base station, e.g., the term base station refers to as gNB in 5G network, and the UE move relative to each other and a time window (dynamic element) is introduced, and the TAL is received and stored at the UE. Other embodiment concerns the UE which modifies/updates the TAL by introducing a dynamic element. Further embodiment concerns a wireless communication network using a temporary TAL.

BACKGROUND OF THE INVENTION

FIG. 1 below is a schematic representation of an example of a terrestrial wireless network 100 including a core network 102 and a radio access network 104. The radio access network 104 may include a plurality of base stations $gNB_1$ to $gNB_5$, each serving a specific area surrounding the base station schematically represented by respective cells $106_1$ to $106_5$. The base stations are provided to serve users within a cell. The term base station, BS, refers to as gNB in 5G networks, eNB in UMTS/LTE/LTE-A/LTE-A Pro, or just BS in other mobile communication standards. A user may be a stationary device or a mobile device. Further, the wireless communication system may be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1 shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1 by the arrows pointing to "core". The core network 102 may be connected to one or more external networks. Further, some or all of the respective base station $gNB_1$ to $gNB_5$ may connected, e.g. via the S1 or X2 interface or XN interface in NR, with each other via respective backhaul links $116_1$ to $116_5$, which are schematically represented in FIG. 1 by the arrows pointing to "gNBs". The wireless network or communication system depicted in FIG. 1 may by an heterogeneous network having two distinct overlaid networks, a network of macro cells with each macro cell including a macro base station, like base station $gNB_1$ to $gNB_5$, and a network of small cell base stations (not shown in FIG. 1), like femto or pico base stations.

For data transmission a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI), etc. For the uplink, the physical channels may further include the physical random access channel (PRACH or RACH) used by UEs for accessing the network once a UE synchronized and obtained the MIB and SIB. The physical signals may comprise reference signals (RS), synchronization signals and the like. The resource grid may comprise a frame or radioframe having a certain duration, like 10 milliseconds, in the time domain and having a given bandwidth in the frequency domain. The frame may have a certain number of subframes of a predefined length, e.g., 2 subframes with a length of 1 millisecond. Each subframe may include two slots of 6 or 7 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any singletone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple accesses, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR, New Radio, standard.

In the wireless communication network as shown in FIG. 1 the radio access network 104 may be a heterogeneous network including a network of primary cells, each including a primary base station, also referred to as a macro base station. Further, a plurality of secondary base stations, also referred to as small cell base stations, may be provided for each of the macro cells.

In addition to the above described terrestrial wireless network also non-terrestrial wireless communication networks exist. FIG. 2 below is a schematic representation of an example of a non-terrestrial wireless communication network 150 including a core network 152 and a radio access network 154. Other than the terrestrial wireless network of FIG. 1, the non-terrestrial wireless network 150 includes a plurality of spaceborne transceivers 156, like satellites, and/or airborne transceivers 158, like unmanned aircraft systems. The respective spaceborne or airborne transceivers 156, 158 may be implemented in respective spaceborne or airborne vehicles, like the above mentioned satellites or unmanned aircraft systems. The transceivers 156 and 158 are provided to serve one or more users, like the UE or the IoT device 110 shown in FIG. 2, which are provided on or above ground 160. The UE and the IoT device may be devices as described above with reference to FIG. 1. The arrows $158_1$ to $158_4$ schematically represent uplink/downlink connections for communicating data between the user UE, 110 and the respective transceiver 156, 158. The transceivers 156, 158 are connected to the core network 152 as is schematically represented by the arrows $162_1$, $162_2$. The above described non-terrestrial wireless communication network or system may operate in a similar way as the terrestrial system described above with reference to FIG. 1, for example in accordance with the LTE-advanced pro standard or the 5G or NR, new radio, standard.

Data communicated between the users UE, 110 and the transceivers 106, 156, 158 of the above described communication networks may be overlaid with noise while being transmitted over the channel 108, 112, 158 so that the data may not be processed correctly or may not be processed at all at the receiver. For example, when the data to be transmitted is encoded using a predefined code, the encoded data is generated at the transmitter and forwarded to the receiver over the channel. During the transmission, the encoded data may be overlaid with noise to such an extent that decoding of the encoded data is not possible, e.g., because of noisy channel situations. To address such a situation, a retransmission mechanism may be employed. For example, when the receiver detects that the encoded data cannot be decoded, a retransmission from the transmitter or sender is requested. For example, a hybrid automatic repeat request, HARQ, may be used to request a retransmission from the transmitter, like the UE, to correct decoding failures. At the transmitter, encoding the data includes generating redundancy that may include redundant bits that are added to the data to be transmitted. During a first transmission only a part of the redundancy may be transmitted. When a retransmission is requested, further parts of the redundancy, also referred to as additional or incremental redundancy, may be send to the receiver. For example, HARQ may employ chase combining (every re-transmission contains the same information-data and parity bits), or incremental redundancy (every retransmission contains different parity bits than the previous one). The retransmission, however, causes a delay due to the additional round-trip time (RTT) which includes the propagation delays over the network and the processing delays at the UE and the receiver.

It is noted that the information in the above section is only for enhancing the understanding of the background of the invention and therefore it may contain information that does not form the known technology that is already known to a person of ordinary skill in the art.

Starting from the known technology as described above, when considering the demand for worldwide connectivity, it seems difficult to cover the entire earth by stationary/terrestrial cellular networks, and therefore, non-stationary networks may be used to support current connectivity demand. That is, the demand for worldwide connectivity is dramatically increasing due to rising number of different services and data demands in a more and more connected world. This also includes connectivity anytime and everywhere. Even if the number of connected areas around the world dramatically increase, it will not be possible to serve every spot on the entire earth, e.g., underserved areas, maritime, planes, and etc. by stationary/terrestrial cellular networks.

In order to support these needs, cellular networks needs to be supported by non-stationary networks as well. These networks could consist of e.g., drones, airplanes, high altitude platforms, low earth orbit satellites, and/or medium earth orbit satellites. By adding non-stationary base stations to the networks of the future the coverage and also the reliability could be easily and dramatically enhanced, which may be used for many future services and applications. In addition, even connectivity between all these different types of platforms may be used to support the quality of service (QOS) needs and ensure service sustainability, e.g. in disaster relief situations. In difference to today's stationary cellular base stations, non-stationary base stations are in motion against fixed locations on earth. To support such moving platforms as base stations within the networks of the future, e.g. 5G, adjustments (deviation to standard procedures) to the networks may be used.

Considering the above mentioned scenario, for avoiding signalling increase, efficient location management may be used. Location management may be used to ensure the reachability of the UE in CN_connected state, especially for paging when the UE is in RRC_idle mode. Location management applied in LTE/NR relies on TALs. Here, TAs (containing several cells) are defined geographically, where each tracking area is associated with a unique TA code (TAC). The base stations within a TA broadcast the TA code of the TA they belong to. The core network (AMF: Access Management Function) assigns to each UE a TAL containing the TACs. The TAL is designed specific for each UE and defines the registration area (RA) region for the UE. The UE can detect when it leaves its RA region by comparing the broadcast TACs with the TACs of its assigned TAL. If none of the received broadcast TACs is in its TAL, the UE requests a RA update. In the presence of high mobility (UE/Satellites), high signalling will occur due to frequent RA updates. To avoid increased signalling, longer lists needs to be shared, however longer lists are associated with additional processing for each list entry at the UE and inefficient paging (with too many base stations).

Thus, the object of the present invention is to provide a wireless communication system to implement efficient location management by using a list including time windows that indicate a valid transmission point for the user device/equipment.

SUMMARY

According to an embodiment, a wireless communication system may have: a plurality of time variant transmission points for communicating with a user device, UE, and a core network, wherein the UE is in a tracking region, wherein the UE is configured to receive and store or modify a list including identifiers, IDs, of time variant transmission points for the tracking region, and wherein the list includes IDs of time variant transmission points which are available or visible for the UE in the one tracking region at different times or time periods, wherein one or more of the transmission points or the core network is configured to provide the list to the UE.

According to another embodiment a wireless communication system may have: a plurality of time variant transmission points for communicating with a user device, UE, wherein the UE is in a tracking region, wherein the UE is configured to create a list including identifiers, IDs, of time variant transmission points for the one tracking region, and wherein the UE includes a function for determining IDs of time variant transmission points currently available or visible for the UE in the tracking region so as to create the list.

Another embodiment may have a user device, UE, for a wireless communication system having a plurality of time variant transmission points for communicating with a user device, UE, and a core network, wherein the UE is in a tracking region, wherein the UE is configured to receive and store or modify a list including identifiers, IDs, of time variant transmission points for the tracking region, and the list includes IDs of time variant transmission points which are available or visible for the UE in the one tracking region at different times or time periods, wherein the core network is configured to provide the list to the UE.

Another embodiment may have a user device, UE, for a wireless communication system including a plurality of time variant transmission points for communicating with a user device, UE, and a core network, wherein the UE is in a tracking region, wherein the UE is configured to create a list including identifiers, IDs, of time variant transmission points for the one tracking region, and the UE includes a function for determining IDs of time variant transmission points currently available or visible for the UE in the tracking region so as to create the list, wherein the core network is configured to provide the list to the UE.

Another embodiment may have a method in a wireless communication system having a plurality of time variant transmission points for communicating with a user device, UE, and a core network, wherein the UE is in a tracking region, the method having the steps of: providing a list including identifiers, IDs, of time variant transmission points for the tracking region, receiving and storing or modifying, by a UE, the received list, and wherein the list includes IDs of time variant transmission points which are available or visible for the UE in the one tracking region at different times or time periods.

Another embodiment may have a method in a wireless communication system having a plurality of time variant transmission points for communicating with a user device, UE, wherein the UE is in a tracking region, the method having the steps of: creating, by the UE, a list including identifiers, IDs, of time variant transmission points for the one tracking region, and determining, by a function included in the UE, IDs of time variant transmission points currently available or visible for the UE in the tracking region so as to create the list.

Another embodiment may have a non-transitory digital storage medium having a computer program stored thereon to perform the method in a wireless communication system including a plurality of time variant transmission points for communicating with a user device, UE, and a core network, wherein the UE is in a tracking region, the method having the steps of: providing a list including identifiers, IDs, of time variant transmission points for the tracking region, receiving and storing or modifying, by a UE, the received list, and wherein the list includes IDs of time variant transmission points which are available or visible for the UE in the one tracking region at different times or time periods, when said computer program is run by a computer.

Another embodiment may have a non-transitory digital storage medium having a computer program stored thereon to perform the method in a wireless communication system including a plurality of time variant transmission points for communicating with a user device, UE, wherein the UE is in a tracking region, the method having the steps of: creating, by the UE, a list including identifiers, IDs, of time variant transmission points for the one tracking region, and determining, by a function included in the UE, IDs of time variant transmission points currently available or visible for the UE in the tracking region so as to create the list, when said computer program is run by a computer.

The present invention provides wireless communication system, comprising: a plurality of time variant transmission points for communicating with a user device, UE, wherein the UE is in a tracking region, wherein the UE is configured to receive and store a list, e.g., in the 3GPP 5G/NR system, a tracking area list (TAL), including identifiers, IDs, e.g., in the 3GPP 5G/NR system, a tracking area IDs (TAIs), of time variant transmission points for the tracking region, and wherein the list includes IDs of time variant transmission points which are available or visible for the UE in the one tracking region at different times or time periods. In other words, there is a system with UEs having a list of IDs of transmission points available/visible at different times (e.g. current and future times) for a tracking region in which the UE is located, wherein the list may be obtained, e.g., from the core network, CN. In general: at time instance k the UE is served by transmission point x, at time instance k+1 the UE is served by transmission point y (this does not occur only with movement but also, when the system assigns different transmission points to one UE at different time instances), however, the UE needs not to be served by the transmission points or be in connected mode, rather a mere communication between them, e.g., for exchanging only control signals may occur, e.g., for a UE being in idle mode. For example, a UE may detect that there are no more TPs (transmission points) available within its defined single tracking region. The UE first receives a TAL from the CN/RAN. Then the UE compares this list with all the IDs it receives. As long as there is at least a single broadcast tracking area ID that matches the TAL, the UE can assume that it is still in the region associated with the TAL. Otherwise it can assume it left the region and triggers a TAL update request towards the CN/RAN.

In accordance with embodiments, the list, e.g., in the 3GPP 5G/NR system, TAL, includes IDs, in the 3GPP 5G/NR system, TAIs in the core network (CN), of a first number of time variant transmission points available for the UE in the one tracking region, in the 3GPP 5G/NR system, the registration area (RA), at a first time or time period, and IDs, e.g., in the 3GPP 5G/NR system, TAIs, of a second number of time variant transmission points available for the UE in the one tracking region at a second time or time period, the first and second times or time periods being separated or being at least partially overlapping.

As already mentioned above, in the 3GPP 5G/NR system, some terms are defined differently. For example, the list refers as the tracking area list, TAL, the IDs refers as the tracking area IDs, TAIs, the tracking area refers as the registration area, RA. These definitions may be considered in the following explanation whole through the present description.

In accordance with embodiments, the UE is configured to process the entries in the list to detect leaving the tracking region, responsive to determining that a received ID for a time variant transmission point is not found in the list, or determine that a received ID for a time variant transmission point is not found in the list which is indicative of the UE leaving the tracking region.

In accordance with embodiments, IDs in the list have associated therewith validity information, the validity information indicating one or more times or time periods at which the associated time variant transmission points are available for the UE in the one tracking region.

In accordance with embodiments, one or more IDs have assigned individual validity information setting a certain validity time length of the entry, or all entries have assigned a common validity time length.

In accordance with embodiments, the validity information comprises a time window specifying a time period during which the associated time variant transmission points are available for the UE in the one tracking region.

In accordance with embodiments, the list includes one or more static IDs which are taken into account by the UE, or the UE includes a further list of one or more static IDs which are taken into account by the UE.

The present invention provides a wireless communication system, comprising: a plurality of time variant transmission points for communicating with a user device, UE, wherein the UE is in a tracking region, wherein the UE is configured to create a list including identifiers, IDs, of time variant transmission points for the one tracking region, and wherein the UE includes a function for determining IDs of time variant transmission points currently available or visible for the UE in the tracking region so as to create the list. In other words, there is provided a system with UEs calculating/creating/generating a list of IDs of transmission points for a tracking region in which the UE is located using a function. A moving pattern, e.g., a mobility pattern in the 3GPP 5G system, may be used to design the list, like a TAL. The initial TAL may be designed in the core system and transmitted to the UE. The invention introduces dynamic elements in the TAL from the system side (like a time window) and the initial TAL may be transmitted to UE, and dynamic elements from UE side, namely to modify entries of the initial TAL by itself (via a list or a predefined function). An example for a moving pattern may be a general moving pattern. Normally the core system, the access and mobility function, AMF, in the 3GPP 5G system, has rough knowledge about the UEs moving pattern. This moving pattern applies more to a moving UE than to a changing transmission point. Another example of a moving pattern may be described by a periodic mathematical function, i.e. the output of the function is periodic. For example: satellites that can be seen at a certain time at a certain point as input, output time window for the satellites, respectively. Yet another example is deterministic pattern, like the trajectory of a moving transmission point mounted, e.g., on a railway.

In accordance with embodiments, the function describes a movement pattern of the transmission points, like a random or deterministic or periodic trajectory of the transmission points, for calculating whether an ID of a time variant transmission point is available or visible for the UE in the one tracking region at a certain time or time period.

In accordance with embodiments, the UE includes an initial list of IDs of time variant transmission points and the UE is configured to select IDs from the initial list using the function to create the list for a certain time or time period.

In accordance with embodiments, the initial list includes at least one ID of one or more periodically re-occurring transmission points, e.g., the periodic occurring or re-occurring of LEO satellites.

In accordance with embodiments, the function uses a respective clock periods of the periodically re-occurring transmission points to select from the list an ID.

For example, the clock period for the periodic entries is specific for the entries. As an example, one satellite may re-occur after 2 h, and another one after 1.5 h, because of different orbit parameters and resulting different visibility of satellite for the UE.

In accordance with embodiments, the wireless communication system comprises: a core network or a core network entity and a RAN network, like an AMF, the core network or the core network entity configured to page a UE in the wireless communication system only via those transmission points indicated in the UE's list.

In accordance with embodiments, the wireless communication system includes: a terrestrial network, or a non-terrestrial network, or networks or segments of networks using as a terminal an airborne vehicle or a spaceborne vehicle, or a combination thereof.

In accordance with embodiments, the plurality of time variant transmission points comprise: a moving transceiver for the UE, the transceiver providing a radio beam, the radio beam having an ID and being available for the UE in the one tracking region at one or more first times or time periods, and being not available for the UE in the one tracking region at one or more second times or time periods, and/or a moving or stationary transceiver for the UE, the transceiver providing a plurality of radio beams, each radio beam having an ID and being available for the UE in the one tracking region at one or more first times or time periods, and being not available for the UE in the one tracking region at one or more second times or time periods.

In accordance with embodiments, the IDs comprises cell IDs, radio access network, RAN, area IDs, or tracking area, TA, IDs.

In accordance with embodiments, the UE comprises one or more of
    a mobile terminal, or
    stationary terminal, or
    cellular IoT-UE, or
    vehicular UE, or
    an IoT or narrowband IoT, NB-IoT, device, or
    a ground based vehicle, or
    an aerial vehicle, or
    a drone, or
    a moving base station, or
    road side unit, or
    a building, or
    any other item or device provided with network connectivity enabling the item/device to communicate using the wireless communication network, e.g., a sensor or actuator, and
the transmission point comprises one or more of
    a macro cell base station, or
    a small cell base station, or
    a central unit of a base station, or
    a distributed unit of a base station, or
    a road side unit, or
    a UE, or
    a remote radio head, or
    an AMF, or
    an SMF, or
    a core network entity, or a network slice as in the NR or 5G core context, or a spaceborne vehicle, like a satellite or a space vehicle at a specific altitude and orbital period or plane, e.g., a low earth orbit (LEO), a medium earth orbit (MEO), a geosynchronous orbit (GSO), a geostationary orbit (GEO), or a high earth orbit (HEO), or an airborne vehicle, like an unmanned aircraft system (UAS), e.g., a tethered UAS, a lighter than air UAS (LTA), a heavier than air UAS (HTA) and a high altitude UAS platforms (HAPs), or any transmission/reception point, TRP, enabling an item or a device to communicate using the wireless communication network, the item or device being provided with network connectivity to communicate using the wireless communication network.

The present invention provides a user device, UE, for a wireless communication system having a plurality of time variant transmission points for communicating with the UE in a tracking region, wherein the UE is configured to receive and store a list including identifiers, IDs, of time variant transmission points for the tracking region which are available or visible for the UE in the one tracking region at different times or time periods.

The present invention provides a user device, UE, for a wireless communication system having a plurality of time variant transmission points for communicating with the UE in a tracking region, wherein the UE is configured to create a list including identifiers, IDs, of time variant transmission points for the one tracking region, and the UE includes a function for determining IDs of time variant transmission points currently available or visible for the UE in the tracking region so as to create the list.

The present invention provides a method in a wireless communication system having a plurality of time variant transmission points for communicating with a user device, UE, wherein the UE is in a tracking region, the method comprising: receiving and storing, by a UE, a list including identifiers, IDs, of time variant transmission points for the tracking region, and wherein the list includes IDs of time variant transmission points which are available or visible for the UE in the one tracking region at different times or time periods.

The present invention provides a method in a wireless communication system having a plurality of time variant transmission points for communicating with a user device, UE, wherein the UE is in a tracking region, the method comprising: creating, by the UE, a list including identifiers, IDs, of time variant transmission points for the one tracking region, and determining, by a function included in the UE, IDs of time variant transmission points currently available or visible for the UE in the tracking region so as to create the list.

The present invention provides a non-transitory computer program product comprising a computer readable medium storing instructions which, when executed on a computer, perform the inventive methods.

BRIEF DESCRIPTION OF THE DRAWINGS

Embodiments of the present invention will be detailed subsequently referring to the appended drawings, in which:

FIG. 8 illustrates a location management performed by introducing a temporary tracking area list in accordance with embodiments of the present invention;

FIG. 9 illustrates a further example of a location management list in accordance with embodiments of the present invention.

DETAILED DESCRIPTION OF THE INVENTION

Embodiments of the present invention are now described in more detail with reference to the accompanying drawings in which the same or similar elements have the same reference signs assigned. At first, some functions that may be used for understanding the present invention are explained.

The location management (LM) is a function of mobile cellular networks, which allows the network to locate the user. Especially when no GPS data is available and the UE is not active, this function ensures the knowledge of the rough position of the UE to establish the connection for an incoming call to the UE, i.e., performing a paging, if needed.

Figure 3:
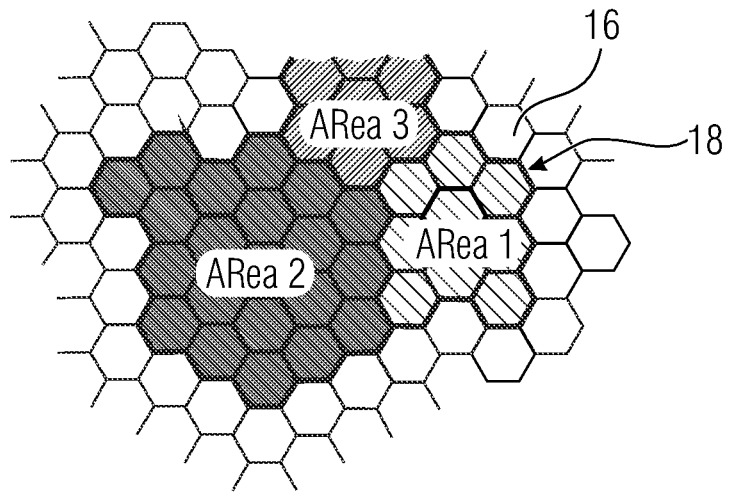
FIG. 3 is a schematic illustration shown a definition of specific areas for location management in accordance with the known technology.

Regardless of the particular location management approach, in general, LM is based on defining specific areas (AR), in which the UE moves freely without updating the network about its current position. FIG. 3 shows an example of the ARs in mobile cellular systems, i.e., the AR corresponds to a cluster 18 of cells 16. The sizes of the AR can be chosen arbitrarily and are subject to the optimization criterion of the network operator, and hence, as shown in FIG. 3, the size of the AR2 is larger than the size of the AR1, and the size of the AR3 is smaller than the size of the AR1. In FIG. 3, it is shown that the AR1 to AR3 are clearly separated/divided, however, the ARs may also be overlapping.

In the 3GPP mobile communication systems, the ARs are known as:

Location areas in GSM (Global System for Mobile communication, 2G)

Routing areas in UMTS (Universal Mobile Telecommunication System, 3G).

Tracking areas in LTE (Long Term Evolution, 4G) and New Radio (NR, 5G).

In the following, two well-known LM techniques are explained. A first explanation relates to a conventional approach as first used in GSM and adopted in UMTS, a second explanation relates to a list-aided-solution as introduced in LTE and extended in NR. For the sake of a better understanding, the ARs in the context of conventional location management are called location areas (LA) and the ARs in the context of list-based location management as tracking areas (TA).

Conventional Location Management

Figure 4:
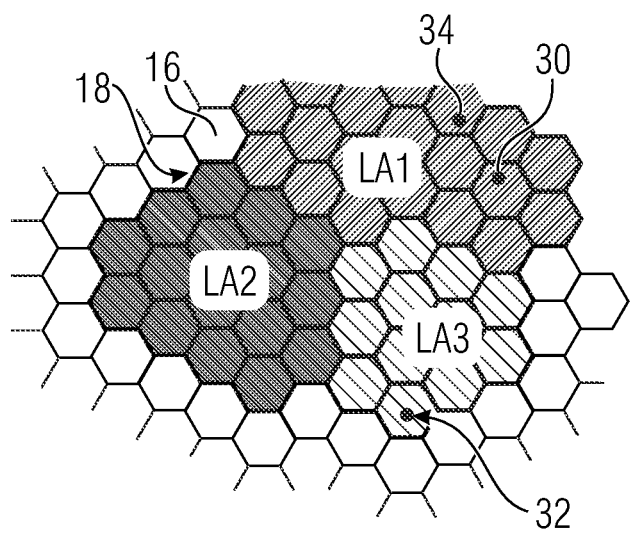
FIG. 4 is a schematic illustration shown a concept of location management in accordance with the known technology.

The conventional location management is a simple approach, which was first widely used in GSM, where the ARs as seen in FIG. 3 are called as location areas (LA) without loss of generality. That is, the LA also corresponds to a cluster 18 of cells 16. For each LA, a unique location area identifier (LA ID) is used to address the LA. In cellular networks each base station broadcasts the LA ID of the LA it belongs to, and the UE obtains at the moment of the registration to the core network (CN) the LA ID of its current LA. FIG. 4 shows the concept of the conventional location management, i.e., there are three LAs, LA1, LA2 and LA3, and user equipment/devices UEx 30 and UEz 34 located in the LA1, and UEy 32 located in the LA3. The LA1 has a LA ID1, the LA2 has a LA ID2 and the LA3 has a LA ID3, hence, the UEx 30 and UEz 34 obtained the LA ID1, and the UEy 32 obtained the LA ID3. In a case as shown in FIG. 4, the UE detects by comparing the broadcast LA ID with the LA ID obtained from the network, if the UE has left located LA. In this case the UE requests a Location Area Update and the CN registers the LA change and communicates subsequently the LA ID of the new LA. For example, UEx 30 has left the LA1 and entered into the LA2, then, the UEx 30 detects the LA ID2 and requests the Location Area Update to the core network (CN). The CN registers the LA is changed and communicates the LA ID2. As explained, the UE obtains only one LA ID, and hence, in principle the conventional LM assigns a plurality of the UEs to a single LA.

List-Based Location Management

Figure 5A:
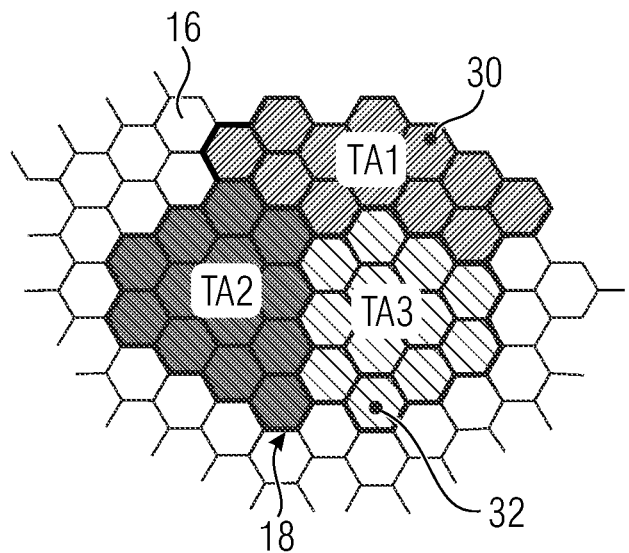
FIGS. 5(a) and (b) are schematic illustrations respectively shown a concept of list-based location management in accordance with the known technology.
Figure 5B:
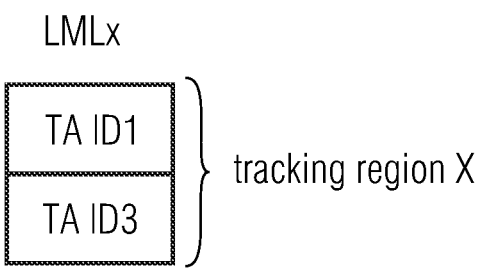
Figure 5B:
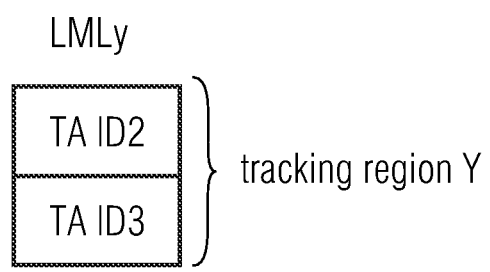

In LTE the list-based LM is employed to enhance effectiveness in location management, where the ARs as seen in FIG. 3 are named tracking areas (TA) without loss of generality, for example, shown as TA1, TA2 and TA3 in FIG. 5 (a). Similar to the conventional LM, each tracking area TA1, TA2 and TA3 obtains a unique identifier—the tracking area identifier TA ID, for example, TA ID1 for TA1, TA ID2 for TA2 and TA ID3 for TA3 which respectively is broadcast by the base station within the tracking area. The effective location management is realized by additionally introducing a location management list (LML) for each UE, which contains a variable number of TA IDs. The TA IDs for the LMLs are selected by the core network (CN), considering specific UE context.

The area specified by the LML is referred to as tracking region (TR) or registration area (RA). The TR is the pendant of the location area in conventional LM, i.e. within the (TR), no update of the location needs to be communicated by the UE to the CN. FIG. 5 (b) shows an exemplarily LML used for the list-based LM. As shown in FIG. 5 (b), the UEx 30 is located in TA1 and the UEy 32 is located in TA3. In this situation, the CN assigns to UEx 30 the LMLx and to UEy 32 the LMLy, wherein each list contains different TA IDs, i.e., the LMLx contains TA ID1 and TA ID3, and the LMLY contains TA ID2 and TA ID3, and hence, it is possible to define different TRs, respectively. That is, the tracking region comprises a plurality of TAs. It can be easily seen, that with list-based LM, the TR, i.e. the region without UE triggered position update, is now variable and depends on the selection of LML entries.

Similar to conventional LM, the UE is able to detect by comparing the LML and the broadcast TA IDs, whenever it leaves the assigned TR. This event triggers the UE to request a tracking area update. The CN assigns subsequently a new LML to the UE.

Regarding to the LM in the 3GPP 5G system NR relies on the list-based approached applied already in LTE as described above, where cells are clustered to a Tracking Area.

The tracking area lists (TALs) as well as location management lists (LMLs) are updated in the CN and assigned to the UE by the access and mobility function (AMF). The algorithms for the TAL design are vendor specific.

Paging

One application where location management may be used is paging. When the UE is not active, this function ensures the knowledge of the rough position of the UE to establish the connection for an incoming call to the UE (paging). By performing the paging, the following problems could occur based on the TAL size.

Case 1: Short List

In case the list, i.e. TAL, is too short, there is a signalling overhead because the UE has to request a TA List Update (or registration area update RAU).

Case 2: Long List
  a) processing overhead is created at the UE, because all elements from the list need to be checked, and
  b) high (unnecessary) number of base stations for paging involved.

For paging, several techniques are known. For example, CN paging, i.e., traditionally paging is initiated by the CN when the UE is in RRC_idle mode. As a further example, in NR, the paging scheme in LTE has been extended with an option for RAN (Radio Access Network) initiated paging. This scheme is needed for the newly introduced RRC_INACTIVE (RRC Connected Inactive) mode for the UE.

According to "RAN Notification Area Configuration in NR" (Jan. 12, 2018) and "Study on New Radio (NR) to support non-terrestrial networks" (August 2018), the following options are technically feasible and RAN2 supports all the options.

Option 1: List of cells; => "RAN paging"
Option 2: List of RAN Area IDs, => "RAN paging"
  A TA (CN Tracking Area) is partitioned in RAN areas which are static and non-overlapping
  Anchor gNB can configure the UE with RNA (RAN notification area)=list of RAN areas
  RAN area ID is defined as TAI (in the 3GPP 5G system, TAI=TAC+PLMN (public land mobile network))+ RANAC (RAN Area Code)
  RANAC size is FFS (suggested between 6 to 8 bits) and to be broadcast by cells in addition to TAC
Option 3: List of TAIs=> "SotA paging in LTE", also known as CN Paging, see section 2.2.1
Moreover, RAN2 has some understanding:
For a UE, only one option is configured at a time (no mixing of options).
NW may provide different options for different UEs.
A UE that supports inactive will support all these options.
It is not yet officially clarified, however, it is clear that the RAN-based notification area could be identified by either a cell list or a RAN area id list. In this contribution, further details are discussed as follows.

Non-Stationary Networks

The challenge of the LM with non-stationary base stations (introduced in 5G) is connected to the movement of the serving entity, for example, as explained in "Location Registration and Paging in Mobile Satellite Systems", McNair, 2000.

A successful mobile satellite communication system in Low Earth Orbit (LEO) is provided by Iridium. Here, paging of the first Iridium system relies on the conventional tracking area approach as used in GSM/UMTS and mentioned above, hence, the definition of the location area is the same for each user, as can be seen in FIG. 3. Nevertheless, most of the existing approaches rely on available GPS data in the UE, which comes along with a higher complexity of the user equipment.

Proposed Solution

In the following, solutions for the above mentioned problems, i.e., solutions for efficient LM are explained. Moreover, the solutions address not only problems with non-stationary base stations (satellite, drones, and etc.), but it is also applicable for the issues with high mobility scenarios in stationary networks (high-speed train, air plane). More generally, the proposed solution is designed for location management issues, whenever the transmission point (e.g., serving beam with MU-MIMO: Multi-user Multi-Input and Multi-Output, moving base station) is changing in time from the UE point of view. As no additional external information of the UE position is available (GPS) this approach is also suited for low-complexity devices.

The solution relies on the more efficient list-based location management as described above. Starting from the problem of longer Location Management Lists (LML) when integrating satellites in the system, it is noticed that longer LML occurs in general with time variant transmission points. To avoid enhanced signalling due to TA or RA update requests, the number of list elements has to be increased, however, at the same time, each additional list element causes more processing at the UE. For this reason, the longer LML is combined with validity information and partial list processing. This allows for signalling reduction along with acceptable processing complexity for the UE, thus resulting into the design of a dynamic LML.

The LML may be signalled either as a single list or as at least two parts, one with a static content (known technology) and other(s) with dynamic content (proposed solution), according to the three possibilities as described further as follows, respectively. Each of these parts of the list may be updated separately.

Time Window and Validity Information

Figure 6:
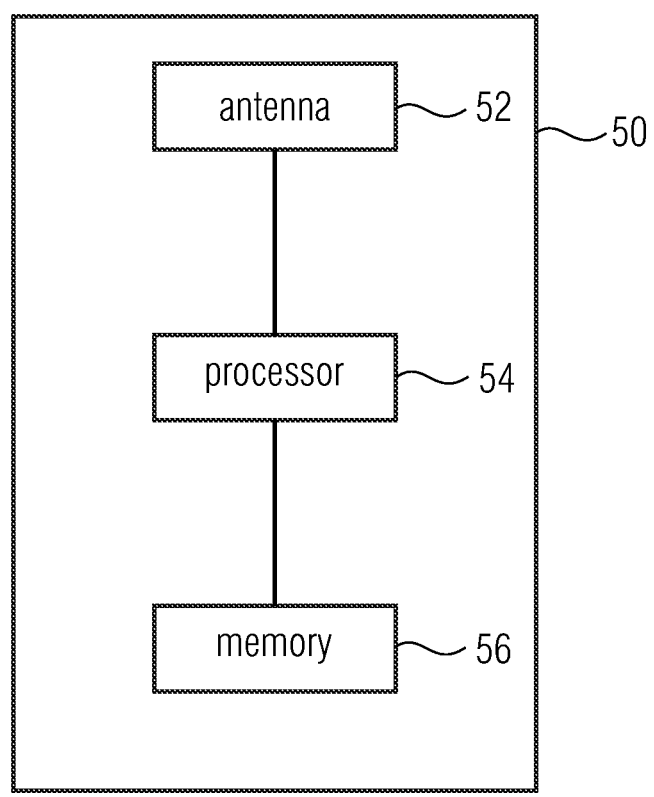
FIG. 6 illustrates a schematic diagram representing a UE in accordance with embodiments of the present invention.

FIG. 6 is a schematic block diagram representing a UE 50 used for a wireless communication system in accordance with the present invention. As shown in FIG. 6, the UE 50 comprising an antenna 52 for receiving signals, a processor 54 for processing signal and a memory 56 for storing the LML.

As mentioned above, the longer TAL causes with each list element more processing at the UE 50 and in the network, thus, a time window is introduced, which specifies the moment or time period, the entry has to be taken into account by the UE.

Figure 1:
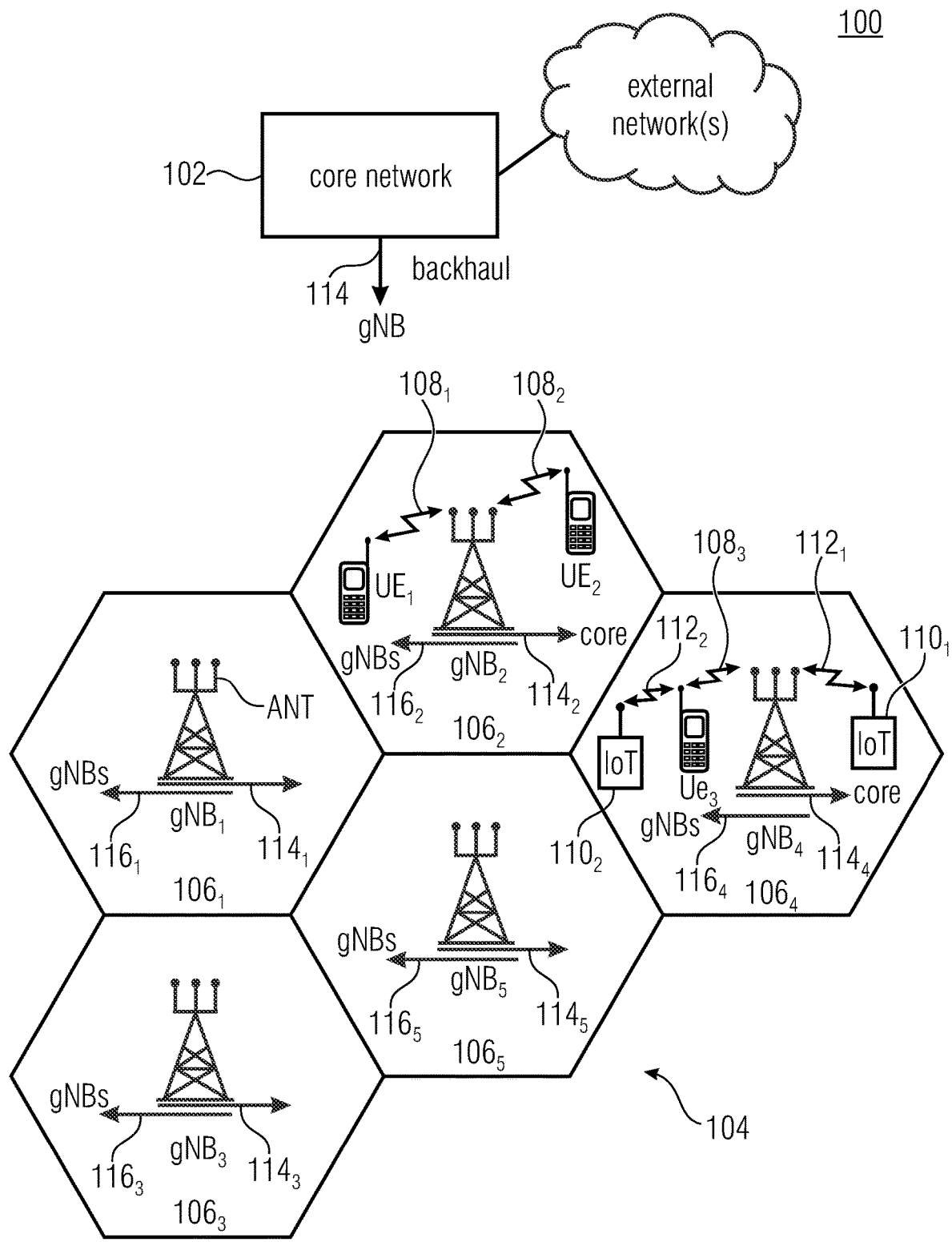
FIG. 1 shows a schematic representation of an example of a wireless communication system.
Figures 7, 8A, 8B:
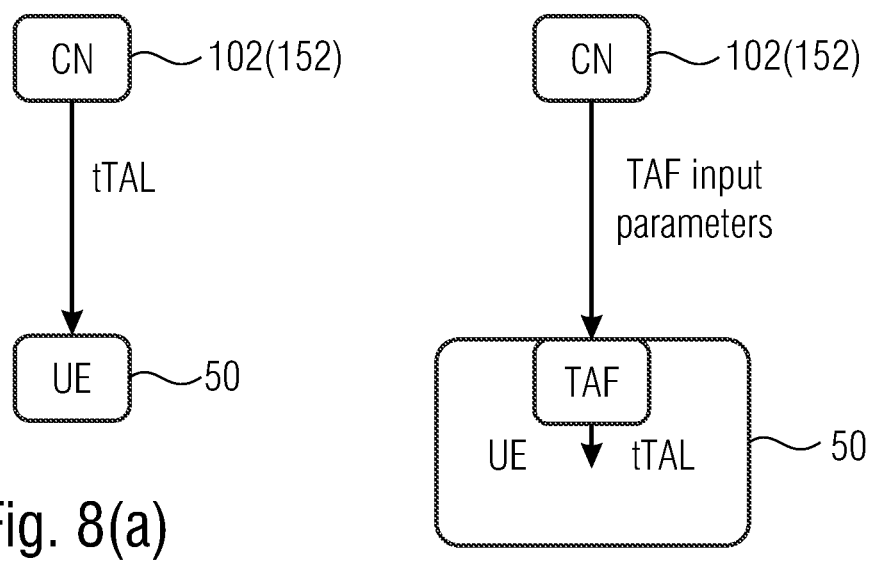
FIG. 7 illustrates an example of a location management list in accordance with embodiments of the present invention.

FIG. 7 illustrates an example of a single LML containing dynamic and static content, e.g., the static content is indicated as "-" and the dynamic content is indicated as "$t_x$-$t_y$" in the right column of the list. The left column of the list contains the IDs of the transmission points (RAN area ID, tracking area ID). The right column of the list contains a validity window which defines the visibility of the ID of the transmission point to the UE 50, i.e., it specifies the activity of the ID of the transmission point (also called "entry" in this description) for a window from time, for example, step $t_x$ to $t_y$. The LML is generated at the core network 102 (see FIG. 1) and provided from the core network 102 to the UE 50. The received LML is stored into the memory 56 of the UE 50.

According to the present invention, there is provided a system with UEs having a list of IDs of transmission points available/visible at different times (e.g. current and future times) for a tracking region in which the UE is located, wherein the list may be obtained, e.g., from the core network, CN. In general: at time instance k the UE is served by transmission point x, at time instance k+1 the UE is served by transmission point y (this does not occur only with movement but also, when the system assigns different transmission points to one UE at different time instances), however, the UE needs not to be served by the transmission points or be in connected mode, rather a mere communication between them, e.g., for exchanging only control signals may occur, e.g., for a UE being in idle mode. For example, a UE may detect that there are no more TPs available within its defined single tracking region. The UE first receives a TAL from the CN/RAN. Then the UE compares this list with all the IDs it receives. As long as there is a single tracking area ID, which is in the TAL, the UE can assume that it is still in the region associated with the TAL. Otherwise it can assume it left the region and triggers a TAL update request towards the CN/RAN.

In case of a single LML, the list may contain static and dynamic content as shown in FIG. 7. So not for all entries, validity information may be used to avoid that more signalling overhead may be used for the case of known art with only terrestrial static cells. In other words, everything in one list, and therefore, no distinction is required between the satellite and the terrestrial beams i.e., it is not necessary to distinct IDs of the beams and IDs of gNBs. Therefore, the IDs are described as a source ID.

In general, the LML contains the IDs of the serving transmission points, e.g. satellite spot beam, relevant beam in case of multi-beam transmission, base station. For 4G/5G systems, this corresponds to a list, which is depending on the type of paging as listed below:
 a list of cells IDs,
 a list of RAN areas IDs, may be used for RAN-Paging
 a list of TA area IDs, may be used for CN-Paging also known as TAL in 4G/5G systems To reduce overhead for the transmission of the list, the validity information, which is transmitted, shall be applicable for at least one entry. This applies, e.g. when multiple cells are provided by the same satellite, so all are visible for the same period of time.

Circular List for Periodic Entry Changes

Figure 2:
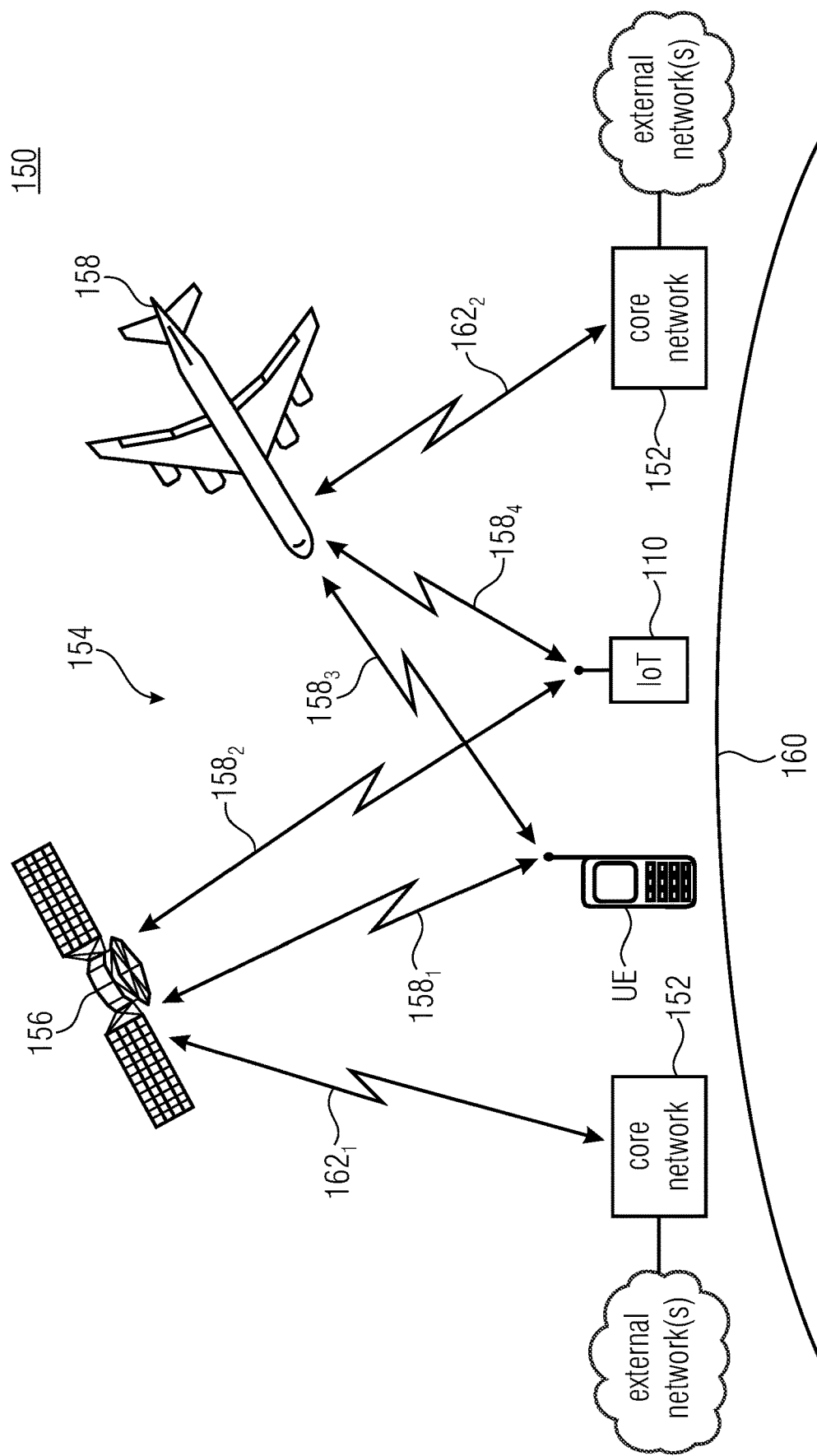
FIG. 2 is a schematic representation of an example of a non-terrestrial wireless communication network including a core network and a radio access network.

A circular list contains entries with dependencies on periodical repetition of the satellites, e.g., re-occurring LEO satellites. For example, the clock period for the periodic entries is specific for the entries. As an example, one satellite may re-occur after 2 h, and another one after 1.5 h, because of different orbit parameters and resulting different visibility of satellite for the UE. The entries can be obtained by the UE 50 (see FIG. 6) under consideration of the output of a circular buffer: a circular buffer/list/register is transmitted once to the UE, where the relevant content is incrementally read out from the circular list at specific time instances. That is, the UE 50 received initial LML from the core network 102 (see FIG. 1) or 152 (see FIG. 2), and received initial LML is stored into the memory 56. Then, by receiving the circular buffer/list/register, the processor 54 of the UE 50 performs updating of the initial LML. Regarding the size of the time window, i.e., the increment (step size $t_m$ to $t_{m+n}$) may be defined by the number of list entries to be read out at one time instance. Hence, for the use of a circular list, the transmission of a clock period and the step size may be used. For IDs updates in the LML, the circular list shall be designed with individual validity information for each entry (to enable different validity time lengths of the entries) or for a common "clock" period of time for each entry.

Predefined Functions for Deterministic Entry Changes

This option is especially suited for quasi-stationary UEs. In this case, the UE will stay within its assigned TA, and hence, no TA updates need to be requested. Nevertheless, LML updates also need to be performed, if TA related system changes take place like the change of transmission point (e.g. new serving satellite, change of beam, and etc.).

A set of functions may be predefined and known to the network as well as the UEs, which are used to generate the entries of the list for source ID and/or validity periods and periodicity information.

As an example, all LEO satellites along one orbital plane get successive cell-IDs and are all visible successively for the same time period. In this case, the transmission of the function parameters to generate cell-ID and validity periods are transmitted only to the UE, instead of all individual list entries. The UE, in this case, automatically updates its tracking area list according to the function(s).

The above mentioned solutions are implemented alone and/or as a combination of them.

Further Aspects of the Invention

As the footprint of a satellite, considering a non-geostationary satellite system, is moving, the tracking areas associated with the satellite beams are non-stationary. Thus, even the UEs, which are not moving, will eventually leave the tracking region defined by a TAL. This will dramatically increase the number of TAL updates depending on the mobility of the satellites, which leads to a high signalling overhead. In other words, in the presence of high mobility (UE/satellites), high signalling overhead will occur due to frequent location list updates. To mitigate the signalling overhead, it is proposed to introduce temporary TALs (tTALs) that are only valid for a specified amount of time. FIG. 8 illustrates a location management performed by introducing a temporary tracking area list tTAL. The tTAL may be directly transmitted from the core network (CN) 102 (152) to the UE 50 as shown in FIG. 8 (a) as a first option, or tracking area function (TAF) parameters are provided from the CN 102 (152) to the UE 50 and the tTAL is generated at the UE 50 by using the TAF as shown in FIG. 8 (b) as a second option.

The TAF could be a simple lookup table that contains TACs (Tracking Area Codes) with their respective time window of validity or a function using the ephemeris data of the serving satellite constellation to predict all TACs that are visible to the UE at a certain location and time instance. For the second option, the CN would need to provide the UE with the needed ephemeris data and the estimated UE location.

Summary of the Solutions

For the efficient location management, the above described solutions could be summarized as follows:

If the moving pattern is pseudo-random, validity information is introduced for each entry which reduces the number of relevant entries for processing at a certain time step.

If the moving pattern follows a periodic behaviour (e.g. re-occurring LEO satellites), new list entries may be generated by a circular buffer.

If the moving pattern is deterministic (satellite trajectory), new list entries can be described by a predefined function. The list entries can be updated automatically after appropriate initialization.

FIG. 9 illustrates a further example of a location management list. As shown in FIG. 9, IDs of gNBs (terrestrial) and IDs of the beams (non-stationary satellite) are listed in the same category as source ID in the left column of the list. Also, in the right column of the list indicate a time stamp to define the visibility of the ID for the UE, i.e., valid time window of the transmission point. The time stamps are not required to have different period, e.g., as shown in FIG. 9, a plurality of time stamps could have the same period.

The above mentioned solutions may be implemented in several scenarios, i.e., scenario with non-stationary base stations e.g. provided via LEO/MEO satellites, or scenario with micro BS on board of vehicles on ground (e.g. cars, trucks, trains) or in the air (e.g. drones, High Altitude Platforms), or scenario with stationary base stations with time variant beams, or with stationary base stations and highly mobile UEs.

Benefits of the Invention

The proposed solution enables efficient location management, even in the presence of high mobility from UE or base stations. Furthermore, in contrast to the known approaches, no GPS information for the UE may be used. Thus, flexible location management can be applied in high-mobility scenarios, while keeping the complexity of the UE as simple as possible.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, a receiver may comprise one or more of a mobile or stationary terminal, an IoT device, a ground based vehicle, an aerial vehicle, a drone, a building, or any other item or device provided with network connectivity enabling the item/device to communicate using the wireless communication system, like a sensor or actuator. In accordance with embodiments, a transmitter may comprise one or more of a macro cell base station, or a small cell base station, or a spaceborne vehicle, like a satellite or a space, or an airborne vehicle, like a unmanned aircraft system (UAS), e.g., a tethered UAS, a lighter than air UAS (LTA), a heavier than air UAS (HTA) and a high altitude UAS platforms (HAPs), or any transmission/reception point (TRP) enabling an item or a device provided with network connectivity to communicate using the wireless communication system.

Although some aspects of the described concept have been described in the context of a system, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 10:
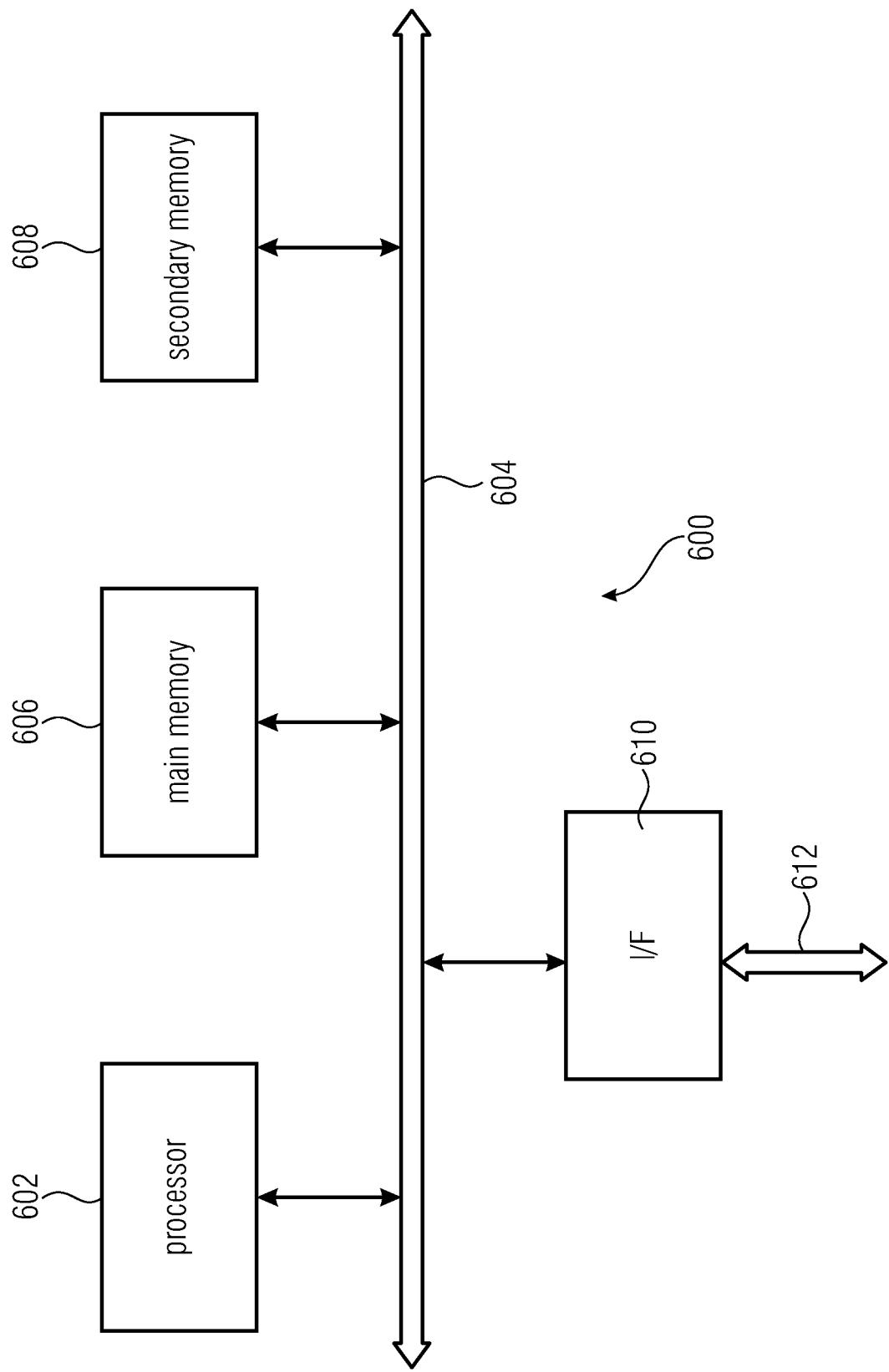
FIG. 10 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. The figure below illustrates an example of a computer system 600 as shown in FIG. 10.

The units or modules as well as the steps of the methods performed by these units may execute on one or more computer systems 600. The computer system 600 includes one or more processors 602, like a special purpose or a general purpose digital signal processor. The processor 602 is connected to a communication infrastructure 604, like a bus or a network. The computer system 600 includes a main memory 606, e.g., a random access memory (RAM), and a secondary memory 608, e.g., a hard disk drive and/or a removable storage drive. The secondary memory 608 may allow computer programs or other instructions to be loaded into the computer system 600. The computer system 600 may further include a communications interface 610 to allow software and data to be transferred between computer system 600 and external devices. The communication may be in the form of electronic, electromagnetic, optical, or other signals capable of being handled by a communications interface. The communication may use a wire or a cable, fiber optics, a phone line, a cellular phone link, an RF link and other communications channels 612.

The terms "computer program medium" and "computer readable medium" are used to generally refer to tangible storage media such as removable storage units or a hard disk installed in a hard disk drive. These computer program products are means for providing software to the computer system 600. The computer programs, also referred to as computer control logic, are stored in main memory 606 and/or secondary memory 608. Computer programs may also be received via the communications interface 610. The computer program, when executed, enables the computer system 600 to implement the present invention. In particular, the computer program, when executed, enables processor 602 to implement the processes of the present invention, such as any of the methods described herein. Accordingly, such a computer program may represent a controller of the computer system 600. Where the disclosure is implemented using software, the software may be stored in a computer program product and loaded into computer system 600 using a removable storage drive, an interface, like communications interface 610.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claim is:

1. A wireless communication system, comprising:
a plurality of movable time variant transmission points for communicating with a user device, UE, and a core network, wherein the plurality of movable time variant transmission points is a plurality of spaceborne vehicles or a plurality of airborne vehicles, and wherein the UE is in a tracking region,
wherein the UE is configured to receive and store or modify a list comprising identifiers, IDs, of time variant transmission points for the tracking region,
wherein the list comprises IDs of time variant transmission points which are available or visible for the UE in the one tracking region at different times or time periods,
wherein one or more of the transmission points or the core network is configured to provide the list to the UE.

2. The wireless communication system of claim 1, wherein the list comprises IDs
of a first number of time variant transmission points available for the UE in the one tracking region at a first time or time period, and IDs of a second number of time variant transmission points available for the UE in the one tracking region at a second time or time period, the first and second times or time periods being separated or being at least partially overlapping.

3. The wireless communication system of claim 1, wherein the UE is configured to process the entries in the list to detect leaving the tracking region, responsive to determining that a received ID for a time variant transmission point is not found in the list, or determine that a received ID for a time variant transmission point is not found in the list which is indicative of the UE leaving the tracking region.

4. The wireless communication system of claim 1, wherein IDs in the list have associated therewith validity information, the validity information indicating one or more times or time periods at which the associated time variant transmission points are available for the UE in the one tracking region.

5. The wireless communication system of claim 4 wherein one or more IDs have assigned individual validity information setting a certain validity time length of the entry, or all entries have assigned a common validity time length.

6. The wireless communication system of claim 4, wherein the validity information comprises a time window specifying a time period during which the associated time variant transmission points are available for the UE in the one tracking region.

7. The wireless communication system of claim 1, wherein the list comprises one or more static IDs which are taken into account by the UE, or the UE comprises a further list of one or more static IDs which are taken into account by the UE.

8. A wireless communication system, comprising:

a plurality of movable time variant transmission points for communicating with a user device, UE, wherein the plurality of movable time variant transmission points is a plurality of spaceborne vehicles or a plurality of airborne vehicles, and wherein the UE is in a tracking region, wherein the UE is configured to create a list comprising identifiers, IDs, of time variant transmission points for the one tracking region, wherein the UE comprises a function for determining IDs of time variant transmission points currently available or visible for the UE in the tracking region so as to create the list.

9. The wireless communication system of claim 8, wherein the function describes a movement pattern of the transmission points or a movement pattern of the UE, for calculating whether an ID of a time variant transmission point is available or visible for the UE in the one tracking region at a certain time or time period.

10. The wireless communication system of claim 8, wherein the UE comprises an initial list of IDs of time variant transmission points and the UE is configured to select IDs from the initial list using the function to create the list for a certain time or time period.

11. The wireless communication system of claim 10, wherein the initial list comprises at least one ID of one or more periodically re-occurring transmission points.

12. The wireless communication system of claim 11, wherein the function uses a respective clock periods of the periodically re-occurring transmission points to select from the list an ID.

13. A wireless communication system, comprising:

a plurality of movable time variant transmission points for communicating with a user device, UE, wherein the plurality of movable time variant transmission points is a plurality of spaceborne vehicles or a plurality of airborne vehicles, wherein the UE is in a tracking region, wherein the UE is configured to create a list comprising identifiers, IDs, of time variant transmission points for the one tracking region, and wherein the UE comprises a function for determining IDs of time variant transmission points currently available or visible for the UE in the tracking region so as to create the list, the system further comprising:

a core network or a core network entity and a RAN network, the core network or the core network entity configured to page a UE in the wireless communication system only via those transmission points indicated in the UE's list.

14. A wireless communication system, comprising:

a plurality of movable time variant transmission points for communicating with a user device, UE, wherein the plurality of movable time variant transmission points is a plurality of spaceborne vehicles or a plurality of airborne vehicles, wherein the UE is in a tracking region, wherein the UE is configured to create a list comprising identifiers, IDs, of time variant transmission points for the one tracking region, and wherein the UE comprises a function for determining IDs of time variant transmission points currently available or visible for the UE in the tracking region so as to create the list, wherein the wireless communication system further comprises a terrestrial network, or a non-terrestrial network, or networks or segments of networks using as a terminal an airborne vehicle or a spaceborne vehicle, or a combination thereof.

15. A wireless communication system, comprising:

a plurality of movable time variant transmission points for communicating with a user device, UE, wherein the plurality of movable time variant transmission points is a plurality of spaceborne vehicles or a plurality of airborne vehicles, wherein the UE is in a tracking region, wherein the UE is configured to create a list comprising identifiers, IDs, of time variant transmission points for the one tracking region, and wherein the UE comprises a function for determining IDs of time variant transmission points currently available or visible for the UE in the tracking region so as to create the list, wherein the plurality of time variant transmission points further comprises:

a moving transceiver for the UE, the transceiver providing a radio beam, the radio beam comprising an ID and being available for the UE in the one tracking region at one or more first times or time periods, and being not available for the UE in the one tracking region at one or more second times or time periods, and/or a moving or stationary transceiver for the UE, the transceiver providing a plurality of radio beams, each radio beam comprising an ID and being available for the UE in the one tracking region at one or more first times or time periods, and being not available for the UE in the one tracking region at one or more second times or time periods.

16. A wireless communication system, comprising:

a plurality of movable time variant transmission points for communicating with a user device, UE, wherein the plurality of movable time variant transmission points is a plurality of spaceborne vehicles or a plurality of airborne vehicles, wherein the UE is in a tracking region, wherein the UE is configured to create a list comprising identifiers, IDs, of time variant transmission points for the one tracking region, and wherein the UE comprises a function for determining IDs of time variant transmission points currently available or visible for the UE in the tracking region so as to create the list, wherein the IDs comprises cell IDs, radio access network, RAN, area IDs, or tracking area, TA, IDs.

17. A wireless communication system, comprising:
a plurality of movable time variant transmission points for communicating with a user device, UE, wherein the plurality of movable time variant transmission points is a plurality of spaceborne vehicles or a plurality of airborne vehicles, and wherein the UE is in a tracking region, wherein the UE is configured to create a list comprising identifiers, IDs, of time variant transmission points for the one tracking region, and wherein the UE comprises a function for determining IDs of time variant transmission points currently available or visible for the UE in the tracking region so as to create the list,
wherein the UE comprises one or more of a mobile terminal, or stationary terminal, or cellular IoT-UE, or vehicular UE, or an IoT or narrowband IoT, NB-IoT, device, or a ground based vehicle, or an aerial vehicle, or a drone, or a moving base station, or road side unit, or a building, or any other item or device provided with network connectivity enabling the item/device to communicate using the wireless communication network, and
wherein the transmission point comprises one
    or more of a macro cell base station, or
    a small cell base station, or
    a central unit of a base station, or a distributed unit of a base station, or
    a road side unit, or
    a UE, or
    a remote radio head, or
    an AMF, or
    an SMF, or
    a core network entity, or
    a network slice as in the NR or 5G core context, or
    any transmission/reception point, TRP, enabling an item or a device to communicate using the wireless communication network, the item or device being provided with network connectivity to communicate using the wireless communication network.

18. A user device, UE, for a wireless communication system, the wireless communication system comprising: a plurality of movable time variant transmission points for communicating with the UE and a core network,
    wherein the plurality of movable time variant transmission points is a plurality of spaceborne vehicles or a plurality of airborne vehicles, wherein
    the UE is in a tracking region,
    the UE is configured to receive and store or modify a list comprising identifiers, IDs, of time variant transmission points for the tracking region,
    the list comprises IDs of time variant transmission points which are available or visible for the UE in the one tracking region at different times or time periods, and
    wherein the core network is configured to provide the list to the UE.

19. A user device, UE, for a wireless communication system, the wireless communication system comprising: a plurality of movable time variant transmission points for communicating with the UE and a core network, wherein the plurality of movable time variant transmission points is a plurality of spaceborne vehicles or a plurality of airborne vehicles wherein
    the UE is in a tracking region,
    the UE is configured to create a list comprising identifiers, IDs, of time variant transmission points for the one tracking region, and
    the UE comprises a function for determining IDs of time variant transmission points currently available or visible for the UE in the tracking region so as to create the list, wherein the core network is configured to provide the list to the UE.

20. A method in a wireless communication system comprising: a plurality of movable time variant transmission points for communicating with a user device, UE, and a core network, wherein the plurality of movable time variant transmission points is a plurality of spaceborne vehicles or a plurality of airborne vehicles, and wherein the UE is in a tracking region, the method comprising:
    providing a list comprising identifiers, IDs, of time variant transmission points for the tracking region,
    receiving and storing or modifying, by a UE, the received list, and
    wherein the list comprises IDs of time variant transmission points which are available or visible for the UE in the one tracking region at different times or time periods.

21. A method in a wireless communication system comprising a plurality of movable time variant transmission points for communicating with a user device, UE, wherein the plurality of movable time variant transmission points is a plurality of spaceborne vehicles or a plurality of airborne vehicles, and wherein the UE is in a tracking region, the method comprising:
    creating, by the UE, a list comprising identifiers, IDs, of time variant transmission points for the one tracking region, and
    determining, by a function comprised by the UE, IDs of time variant transmission points currently available or visible for the UE in the tracking region so as to create the list.

22. A non-transitory digital storage medium having a computer program stored thereon to perform the method in a wireless communication system comprising a plurality of movable time variant transmission points for communicating with a user device, UE, and a core network, wherein the plurality of movable time variant transmission points is a plurality of spaceborne vehicles or a plurality of airborne vehicles, and wherein the UE is in a tracking region, the method comprising:
    providing a list comprising identifiers, IDs, of time variant transmission points for the tracking region,
    receiving and storing or modifying, by a UE, the received list, and
    wherein the list comprises IDs of time variant transmission points which are available or visible for the UE in the one tracking region at different times or time periods,
when said computer program is run by a computer.

23. A non-transitory digital storage medium having a computer program stored thereon to perform the method in a wireless communication system comprising: a plurality of movable time variant transmission points for communicating with a user device, UE, wherein the plurality of movable time variant transmission points is a plurality of spaceborne vehicles or a plurality of airborne vehicles, and wherein the UE is in a tracking region, the method comprising:
　　creating, by the UE, a list comprising identifiers, IDs, of time variant transmission points for the one tracking region, and
　　determining, by a function comprised by the UE, IDs of time variant transmission points currently available or visible for the UE in the tracking region so as to create the list,
when said computer program is run by a computer.

* * * * *